(12) United States Patent
Kondo

(10) Patent No.: US 7,013,967 B2
(45) Date of Patent: Mar. 21, 2006

(54) AIR CONDITIONER FOR VEHICLE

(75) Inventor: Hitoshi Kondo, Kariya (JP)

(73) Assignee: Denso Corporation, Kariya (JP)

(*) Notice: Subject to any disclaimer, the term of this patent is extended or adjusted under 35 U.S.C. 154(b) by 299 days.

(21) Appl. No.: 10/295,581

(22) Filed: Nov. 14, 2002

(65) Prior Publication Data
US 2003/0094262 A1 May 22, 2003

(30) Foreign Application Priority Data
Nov. 22, 2001 (JP) ......................... 2001-357443

(51) Int. Cl.
B60H 1/00 (2006.01)

(52) U.S. Cl. ..................... 165/204; 165/203; 62/244
(58) Field of Classification Search ............... 165/42, 165/43, 202, 203, 204; 62/244
See application file for complete search history.

(56) References Cited

U.S. PATENT DOCUMENTS 5,086,628 A * 2/1992 Hashimoto ................ 165/42
5,237,828 A 8/1993 Kutsuna
5,704,544 A * 1/1998 Samukawa et al. ......... 165/203
5,775,407 A * 7/1998 Inoue .......................... 165/43
6,247,530 B1 6/2001 Mochizuki et al.

FOREIGN PATENT DOCUMENTS

JP 2001-030733 2/2001

OTHER PUBLICATIONS

Notice of Preliminary Rejection in Korean Application No. 10-2002-0070917 dated Oct. 30, 2004, translated.

* cited by examiner

Primary Examiner—Ljiljana Ciric
(74) Attorney, Agent, or Firm—Harness, Dickey & Pierce, PLC

(57) ABSTRACT

In a vehicle air conditioner, a heater core is disposed in an air conditioning case to form front and rear cool air bypass passage through which cool air bypasses the heater core, and front and rear air mixing doors are disposed to independently adjust temperature of air blown toward a front seat side and temperature of air blown toward a rear seat side in a passenger compartment. A switching door is disposed to partition front and rear passage portions of the heater core from each other at a partition position, and to shut the rear passage portion at a rear shutting position. The switching door and the rear air mixing door are connected to a common operation mechanism to be operatively linked with each other.

14 Claims, 10 Drawing Sheets

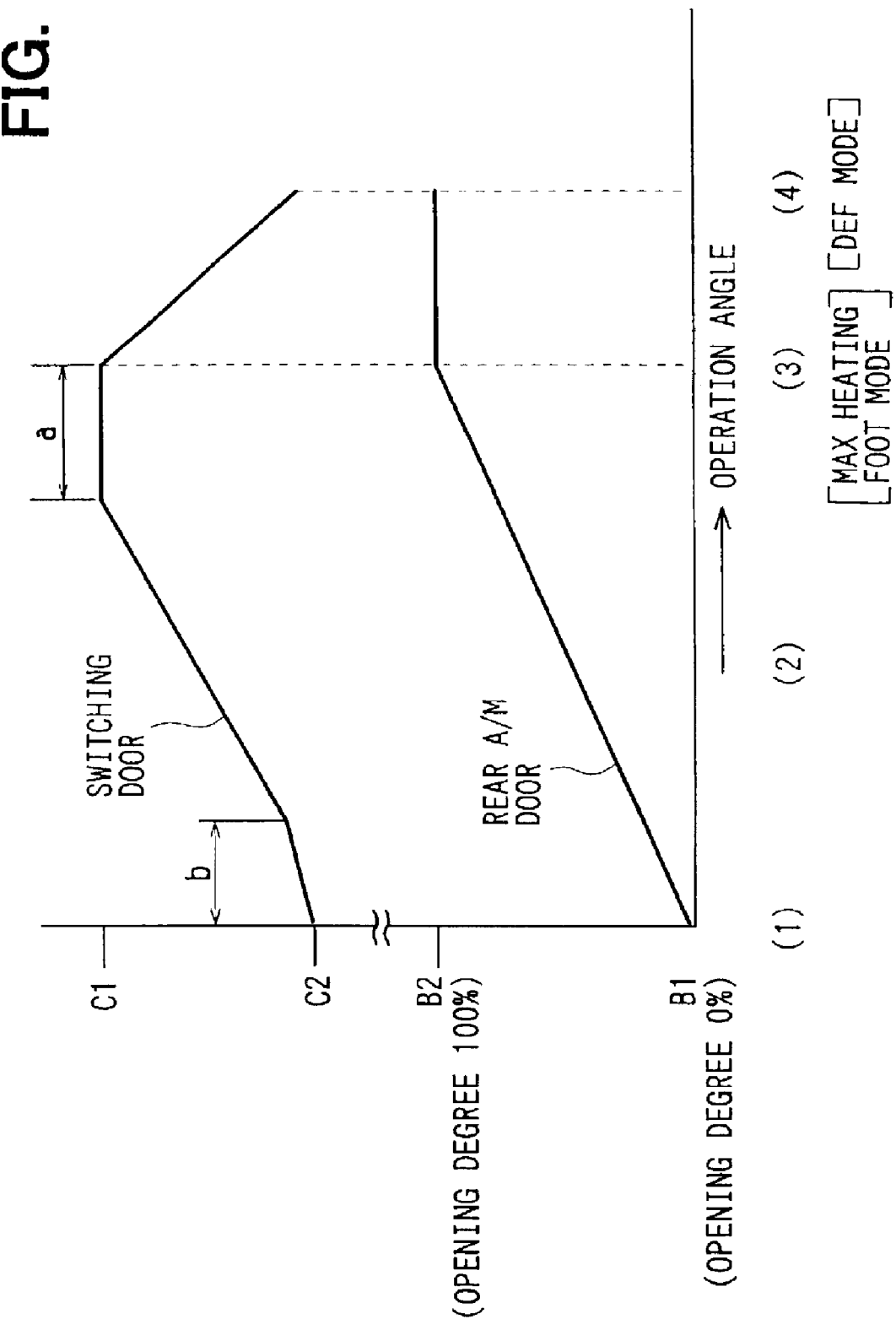

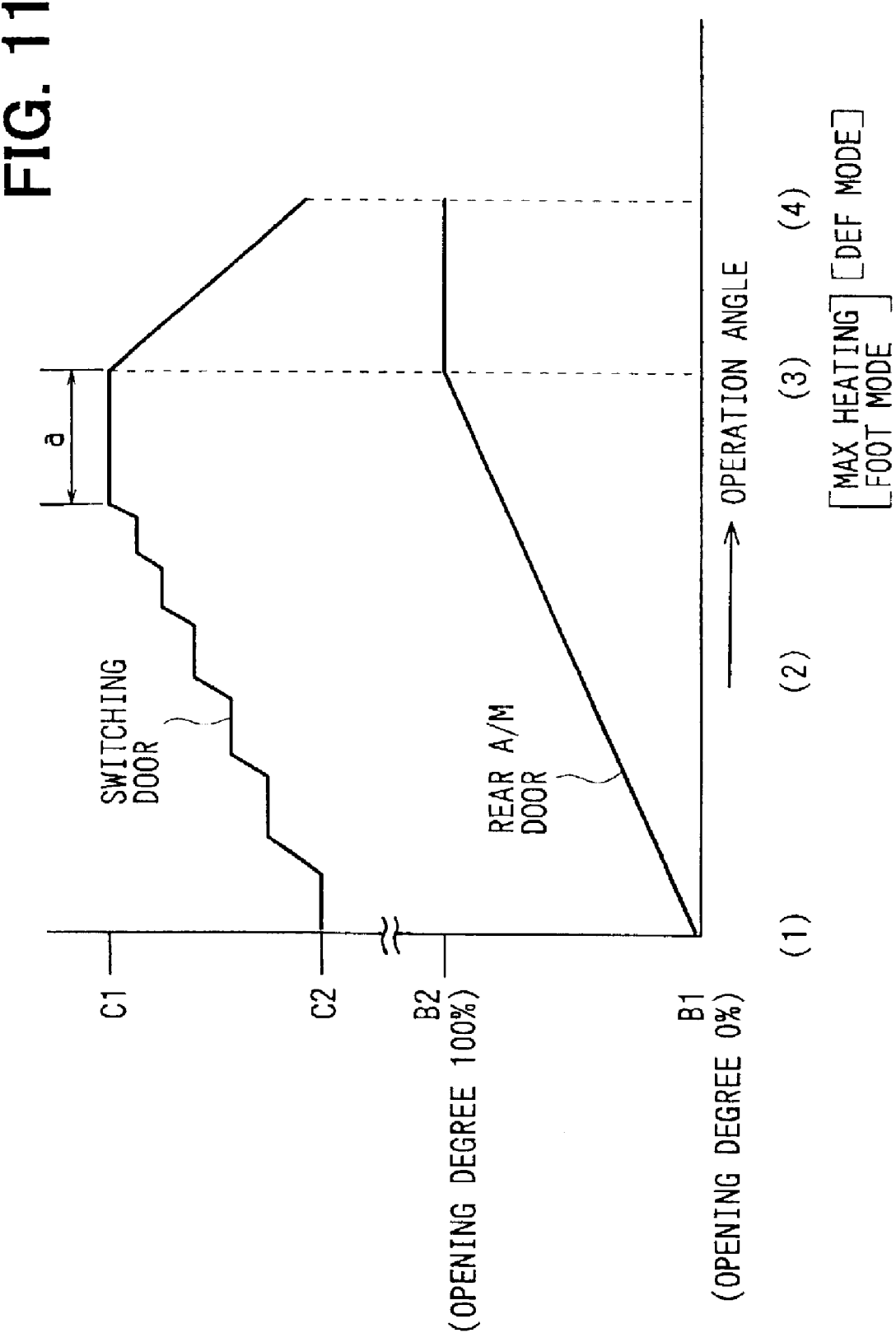

AIR CONDITIONER FOR VEHICLE

CROSS REFERENCE TO RELATED APPLICATION

This application is based on Japanese Patent Application No. 2001-357443 filed on Nov. 22, 2001, the disclosure of which is incorporated herein by reference.

BACKGROUND OF THE INVENTION

1. Field of the Invention

The present invention relates to a vehicle air conditioner which can independently control temperature of air blown toward a front seat side and temperature of air blown toward a rear seat side in a passenger compartment.

2. Description of Related Art

In a vehicle air conditioner described in U.S. Pat. No. 6,247,530, a single heating heat exchanger disposed in an air conditioning case is used in common for heating a front seat side and a rear seat side of a passenger compartment. Further, a front air mixing door and a rear air mixing door are independently disposed so that temperature of air blown toward the front seat side and temperature of air blown toward the rear seat side are independently controlled. In the vehicle air conditioner, a switching door is disposed at an air outlet side of the heating heat exchanger, for partitioning an air passage of the heating heat exchanger into a front air passage and a rear air passage at a partition position. Generally, the switching door is positioned at the partition position. When heating capacity of the front seat side is need to be increased, the switching door is operated at a rear shutting position where all warm air passage of the heating heat exchanger communicates only the front air passage. However, in the vehicle air conditioner, the switching door is connected to an actuator mechanism for switching a front air outlet mode through a link mechanism, or a special actuator mechanism having a special motor is provided for operating the switching door.

When the switching door is connected to the actuator mechanism for switching the front air outlet mode, a long link mechanism is necessary for operatively linking the switching door and the actuator mechanism of the front air outlet mode. Therefore, the structure of the link mechanism becomes complex and the size of the link mechanism becomes larger. On the other hand, when the switching door is operated by the special actuator mechanism having the special motor, the production cost is increased, and it is difficult to arrange the special actuator mechanism in a small mounting space.

SUMMARY OF THE INVENTION

In view of the above-described problems, it is an object of the present invention to reduce the size of a door operation mechanism and to simplify the structure of the door operation mechanism, in a vehicle air conditioner where a warm air passage of a heating heat exchanger can be partitioned into first and second passage portions so that temperature of air blown toward a front side and temperature of air blown toward a rear side in a passenger compartment can be independently controlled.

It is another object of the present invention to improve temperature control performance of air blown toward the rear side in the passenger compartment in the vehicle air conditioner.

According to the present invention, in a vehicle air conditioner, a cooling heat exchanger for cooling air is disposed in an air conditioning case, and a heating heat exchanger for heating air from the cooling heat exchanger is disposed in the air conditioning case to form first and second bypass passages through which air having passed through the cooling heat exchanger bypasses the heating heat exchanger. A first air mixing door for adjusting a ratio between an amount of air passing through the first bypass passage and an amount of air passing through the heating heat exchanger is disposed so that air blown toward the front seat side of the passenger compartment from a front opening portion has a predetermined temperature, and a second air mixing door for adjusting a ratio between an amount of air from the second bypass passage and an amount of air from the heating heat exchanger in such a manner that air blown toward the rear seat side of the passenger compartment from the rear opening portion has a predetermined temperature. Further, a switching door is disposed to partition a warm air passage of the heating heat exchanger into a first passage portion for introducing air toward the front opening portion and a second passage portion for introducing air toward the rear opening portion, at a partition position. In addition, the switching door is operated between the partition position and a rear shutting position where all air from the heating heat exchanger flows toward the front opening portion. In the vehicle air conditioner, an operation mechanism is used in common for operating the switching door and the second air mixing door, and the switching door and the second air mixing door are operatively linked with each other by the operation mechanism. Because the switching door and the second air mixing door are disposed adjacent to the heating heat exchanger, the switching door and the second air mixing door can be disposed near the operation mechanism when the operation mechanism is disposed adjacent to the heating heat exchanger. Therefore, the operation mechanism for operating the second air mixing door and the switching door can be made smaller, and has a simple structure.

Preferably, the operation mechanism is constructed to have a first operation position where the second air mixing door is positioned at a maximum heating position and the switching door is positioned at the partition position, and a second operation position where the second air mixing door is positioned at the maximum heating position and the switching door is positioned at the rear shutting position. Accordingly, when the operation mechanism is operated at the first operation position, the heating capacity for heating the rear seat side in the passenger compartment can be made maximum. On the other hand, when the operation mechanism is operated to the second operation position, all warm air from the heating heat exchanger can be introduced into the front seat side in the passenger compartment, and the heating capacity for heating the front seat side in the passenger compartment can be made maximum.

Preferably, the operation mechanism is constructed such that the switching door is moved from the rear shutting position toward the partition position when the second air mixing door is moved from the maximum cooling position toward the maximum heating position. Therefore, by adjusting the opening degrees of the second air mixing door and the switching door, the control characteristic of temperature of air blown toward the rear seat side can be readily changed. As a result, the operation mechanism can be readily used for different type vehicle.

Preferably, the operation mechanism is constructed to have a third operation position where the switching door is positioned at the rear shutting position and the second air mixing door is positioned at the maximum cooling position. Therefore, maximum cooling performance for the rear seat side of the passenger compartment can be effectively improved.

Further, according to the present invention, the operation mechanism is constructed such that a reduce rate of the opening degree of the second passage portion of the heating heat exchanger, when the switching door is moved from the partition position toward the rear shutting position, is made smaller, relative to an increase rate of the opening degree of the second cool air bypass passage when the second air mixing door is moved from the maximum heating position toward the maximum cooling position. Accordingly, in a predetermined area proximate to the maximum heating position of the second air mixing door, it can prevent the temperature of air blown toward the rear seat side from the greatly reduced, and air conditioning performance for the rear seat side of the passenger compartment can be improved.

BRIEF DESCRIPTION OF THE DRAWINGS

Other objects, features and advantages of the present invention will become more apparent from the following detailed description made with reference to the accompanying drawings, in which:

FIG. 10 is a graph showing operation patterns of a rear air mixing door and a switching door, according to a second embodiment of the present invention; and FIG. 11 is a graph showing operation patterns of a rear air mixing door and a switching door, according to a third embodiment of the present invention.

DETAILED DESCRIPTION OF THE PRESENTLY PREFERRED EMBODIMENTS

Figure 1:
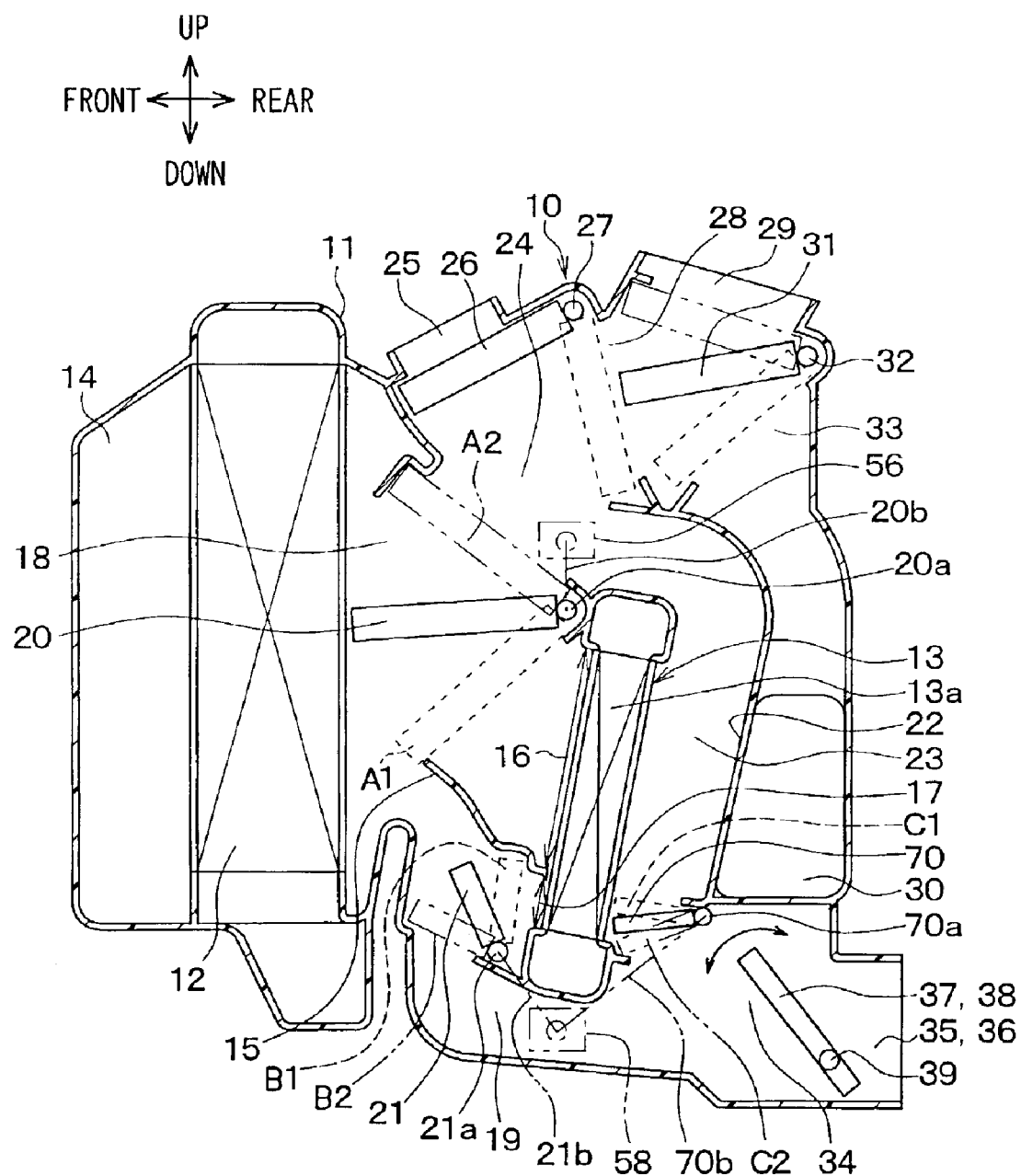
FIG. 1 is a vertical sectional view showing an air conditioning unit of a vehicle air conditioner according to a first embodiment of the present invention.

Preferred embodiments of the present invention will be described hereinafter with reference to the accompanying drawings.

A first preferred embodiment of the present invention will be now described with reference to FIGS. 1–9. An air conditioner for a vehicle includes a blower unit 1 and an air conditioning unit 10, as shown in FIG. 2. In the first embodiment, the air conditioning unit 10 is disposed at an approximate center in a vehicle right-left direction, inside an instrument panel in a passenger compartment of the vehicle. The blower unit 1 is disposed at an offset position to be offset from the air conditioning unit 10 toward a front passenger's seat side in the vehicle right-left direction, for example.

The blower unit 1 has an inside/outside air switching box 2 and a blower 6. The inside/outside air switching box 2 includes an outside air introduction port 3 for introducing outside air (i.e., air outside the passenger compartment) and an inside air introduction port 4 for introducing inside air (i.e., air inside the passenger compartment). The outside air introduction port 3 and the inside air introduction port 4 are opened and closed by an inside/outside air switching door 5. The blower 6 for blowing air toward the air conditioning unit 10 includes a centrifugal fan 7 for blowing air, a scroll casing 8 for accommodating the centrifugal fan 7, and a driving motor 9 for driving the centrifugal fan 7. The blower 6 is disposed under the inside/outside air switching box 2, for example.

The air conditioning unit 10 includes an evaporator (i.e., cooling heat exchanger) 12 and a heater core (i.e., heating heat exchanger) 13 which are integrally accommodated in a single air conditioning case 11. The air conditioning case 11 is made of resin which has an elasticity to some degree and is superior in a strength, such as polypropylene. The air conditioning case 11 is composed of plural division cases which are integrally connected by a fastening member such as a metal spring clip and a screw, after the evaporator 12, the heater core 13 and components such as doors are accommodated therein.

Figure 2:
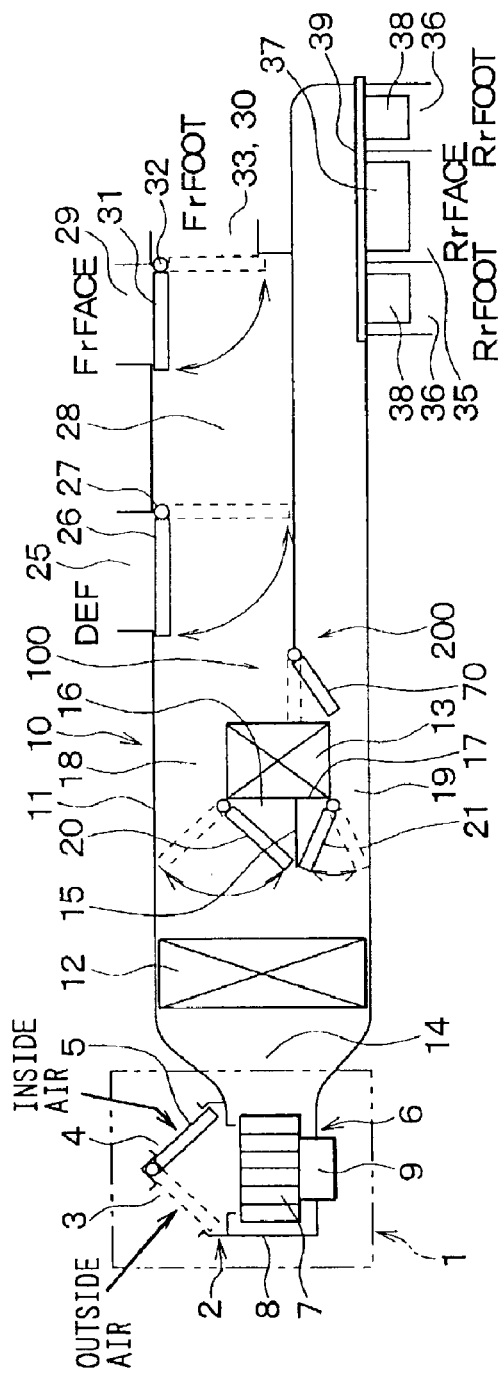
FIG. 2 is a schematic diagram showing a ventilation system of the vehicle air conditioner according to the first embodiment.

The air conditioning unit 10 is disposed at a lower side of the instrument panel in the passenger compartment, and is arranged as shown in FIG. 1 in a vehicle front-rear direction and in a vehicle up-down direction. An air inlet 14 into which air from the scroll casing 8 of the blower unit 1 flows is provided in the air conditioning case 11 at a most vehicle front side.

The evaporator 12 is disposed within the air conditioning case 11 at an immediately downstream side of the air inlet 14. The evaporator 12 is thin in the vehicle front-rear direction, and is disposed in the air conditioning case 11 to cross an air passage in such a manner that a longitudinal direction thereof extends in the vehicle up-down direction. As being known well, the evaporator 12 cools air in the air conditioning case 11 by absorbing an evaporation latent heat of refrigerant in a refrigerant cycle from the air.

A heater core 13 is disposed in the air conditioning case 11 on a downstream side of the evaporator 12 to form a predetermined distance between the evaporator 12 and the heater core 13. The heater core 13 is disposed on a lower side within the air conditioning case 11 to be inclined from the vehicle up-down direction toward a vehicle rear side. In the embodiment, each width dimension of the evaporator 12 and the heater core 13 in the vehicle right-left direction is approximately equal to a width dimension of the air conditioning case 11 in the vehicle right-left direction.

The heater core 13 heats air having passed through the evaporator 12 by using hot water (engine-cooling water) flowing therein as a heating source. A front cool air bypass passage 18 (first cool air bypass passage) and a rear cool air bypass passage 19 (second cool air bypass passage) through which air having passed through the evaporator 12 bypasses the heater core 13 are provided, respectively, at upper and lower sides of the heater core 13 within the air conditioning case 11. The front cool air bypass passage 18 is provided for a front seat side in the passenger compartment, and the rear cool air bypass passage 19 is provided for a rear seat side in the passenger compartment.

The heater core 13 includes a core portion 13a composed of plural flat tubes in which hot water flows and plural corrugated fins each of which is connected between adjacent flat tubes. An air passage through which air passes through the core portion 13a of the heater core 13 is partitioned by a partition member 15 into front and rear air passages 16, 17. The front air passage 16 is for introducing warm air to the front seat side, and is provided at an upper side of the partition member 15. On the other hand, the rear air passage 17 is for introducing warm air to the rear seat side, and is provided at a lower side of the partition member 15. The partition member 15 is disposed at an upstream air side of the heater core 13, and extends in an entire width length of the air conditioning case 11 in the vehicle right-left direction. For example, the partition member 15 is formed integrally with the air conditioning case 11.

A plate-like front air mixing door 20 for adjusting temperature of air blown toward the front seat side of the passenger compartment is disposed between the heater core 13 and the evaporator 12. The front air mixing door 20 adjusts a ratio between an amount of air passing through the front air passage 16 of the heater core 13 and an amount of air passing through the front cool air bypass passage 18 while bypassing the heater core 13. The front air mixing door 20 is integrally connected to a rotation shaft 20a disposed in a horizontal direction (i.e., vehicle right-left direction), and is rotated around the rotation shaft 20a in the vehicle up-down direction. By adjusting a rotation position of the front air mixing door 20, temperature of air blown toward the front seat side of the passenger compartment can be adjusted.

The rotation shaft 20a of the front air mixing door 20 is rotatably held in the air conditioning case 11. One end of the rotation shaft 20a protrudes from the air conditioning case 11 toward an outside, and is connected to a driving motor 56 through a link mechanism 20b. The rotation position (opening degree) of the front air mixing door 20 is independently adjusted by an actuator mechanism having the driving motor 56.

A plate-like rear air mixing door 21 for adjusting temperature of air blown toward the rear seat side of the passenger compartment is disposed rotatably between the heater core 13 and the evaporator 12. The rear air mixing door 21 adjusts a ratio between an amount of air passing through the rear air passage 17 of the heater core 13 and an amount of air passing through the rear cool air bypass passage 19 while bypassing the heater core 13. The rear air mixing door 21 is integrally connected to a rotation shaft 21a disposed in a horizontal direction (i.e., vehicle right-left direction), and is rotated around the rotation shaft 21a in the vehicle up-down direction. By adjusting a rotation position of the rear air mixing door 21, temperature of air blown toward the rear seat side of the passenger compartment can be adjusted.

The rotation shaft 21a of the rear air mixing door 20 is rotatably held in the air conditioning case 11. One end of the rotation shaft 21a protrudes from the air conditioning case 11 toward an outside, and is connected to a driving motor 58 through a link mechanism 21b. The rotation position (opening degree) of the rear air mixing door 20 is independently adjusted by an actuator mechanism having the driving motor 58.

A wall member 22 extending in the up-down direction is formed integrally with the air conditioning case 11 at a downstream side (vehicle rear side) of the heater core 13 to form a predetermined distance between the heater core 13 and the wall member 22. Therefore, a front warm air passage 23 extending upwardly from an immediately downstream side of the heater core 13 is defined by the wall member 22. A switching door 70 is disposed at a lower end portion of the wall member 22, that is, at a lower portion of an air outlet portion of the heater core 13, to be rotatable around a rotation shaft 70a. The switching door 70 will be described later in detail.

A downstream air side (upper side) of the front warm air passage 23 and a downstream air side of the front cool air bypass passage 18 are joined at an upper side of the heater core 13 in a front air mixing chamber 24 where cool air from the front cool air bypass passage 18 and warm air from the warm air passage 23 are mixed.

A defroster opening portion 25 is opened in an upper wall surface of the air conditioning case 11 at a vehicle front side so that conditioned air is introduced into the defroster opening portion 25 from the front air mixing chamber 24. The defroster opening portion 25 communicates with a defroster air outlet through a defroster duct, so that conditioned air is blown toward an inner surface of a windshield from the defroster air outlet.

The defroster opening portion 25 is opened and closed by a plate-like defroster door 26, and the defroster door 26 is rotated by a rotation shaft 27 disposed horizontally at a position proximate to the upper wall surface of the air conditioning case 11. The defroster door 26 is disposed to open and close the defroster opening portion 25 and a communication port 28. The communication port 28 is provided for introducing conditioned air from the front air mixing chamber 24 to a front face opening portion 29 and a front foot opening portion 30.

The front face opening portion 29 is provided on the upper wall surface of the air conditioning case 11 at a vehicle rear side from the defroster opening portion 25. The front face opening portion 29 communicates with a front face air outlet provided on an upper side of the instrument panel, through a front face air duct, so that conditioned air is blown toward an upper side of a passenger on a front seat of the passenger compartment.

The front foot opening portion 30 is provided on a lower side of the front face opening portion 29 in the air conditioning case 11, and is provided on right and left side surfaces of the air conditioning case 11. Air blown from the front foot opening portion 30 is blown toward the foot area of a passenger on the front seat of the passenger compartment.

The front face opening portion 29 and the front foot opening portion 30 are opened and closed by a plate-like foot/face switching door 31 disposed between both of the opening portions 29, 30. That is, the foot/face switching door 31 is rotated by a rotation shaft 32 to open and close the front face opening portion 29 and an inlet side passage 33 of the front foot opening portion 30. The defroster door 26 and the foot/face switching door 31 are operatively connected to an output shaft of a common driving motor 57 (FIG. 3) through a link mechanism, so that the defroster door 26 and the foot/face switching door 31 are operatively linked by an actuator mechanism having the driving motor 57.

On the other hand, air from the rear air passage 17 of the heater core 13 and air from the rear cool air bypass passage 19 are mixed in a rear air mixing chamber 34 so that conditioned air having a predetermined temperature can be obtained.

A rear face opening portion 35 and two rear foot opening portion 36 are provided at a downstream side (e.g., vehicle rear side) of the rear air mixing portion 34. In the first embodiment, as shown in FIG. 2, the rear face opening portion 35 is provided at a center between the two rear foot opening portions 36 in the vehicle right-left direction on a rear downstream side portion of the air conditioning case 11. The rear face opening portion 35 is opened and closed by a rear face door 37, and the rear foot opening portions 36 are opened and closed by rear foot doors 38, as shown in FIG. 2. Further, the rear face door 37 and the two rear foot doors 38 are disposed to be rotated by a single rotation shaft 39. That is, the plural rear air-outlet mode switching doors 37, 38 are connected to the single rotation shaft 39 extending in the vehicle right-left direction, to be operatively linked with each other. Because attachment angles of the doors 37, 38 relative to the rotation shaft 39 are changed, rear opening/closing states of the rear opening portions 35 and 36 can be selectively switched by changing the rotation angle of the single rotation shaft 39, so that a rear air outlet mode can be selected. That is, by changing the rotation angle of the single rotation shaft 39, the rear air outlet mode such as a rear face mode, a rear foot mode, a rear bi-level mode and a rear shutting mode can be selectively set. In the rear face mode, the rear face opening portion 35 is opened, and the rear foot opening portions 36 are closed. In the rear foot mode, the rear face opening portion 35 is closed, and the rear foot opening portions 36 are opened. In the rear bi-level mode, the rear face opening portion 35 is opened, and the rear foot opening portions 36 are opened. Further, in the rear shutting mode, the rear face opening portion 35 is closed, and the rear foot opening portions 36 are closed.

The rear face opening portion 35 communicates with a rear face air outlet through a connection duct, so that conditioned air is blown toward the upper side of a passenger on a rear seat of the passenger compartment. The rear foot opening portion 36 communicates with a rear foot air outlet through a connection duct, so that conditioned air is blown toward the lower side of the passenger on the rear seat of the passenger compartment.

The rotation shaft 39 of the rear air-outlet mode switching doors 37, 38 is rotatably held in the air conditioning case 11. One end of the rotation shaft 39 protrudes to an outside of the air conditioning case 11, and is connected to an output shaft of a driving motor 59 through a link mechanism. Therefore, operation positions of the rear mode switching doors 37, 38 can be independently set by the driving motor 59.

The switching door 70 is disposed at the lower side position of the heater core 13 on a downstream side position of the heater core 13. When the switching door 70 is operated to the chain line position C1 in FIG. 1, the switching door 70 is positioned on an extending line of the partition member 15, so that the front air passage 16 and the rear air passage 17 of the heater core 13 are partitioned from each other, and a communication between the rear air passage 17 of the heater core 13 and the front warm air passage 23 is interrupted. Accordingly, the chain line position C1 of the switching door 17 is a partition position.

On the other hand, when the switching door 70 is operated to the chain line position C2 in FIG. 1, a communication between the rear air passage 17 of the heater core 13 and the rear air mixing chamber 34 is interrupted, and the rear air passage 17 of the heater core 13 communicates with the front warm air passage 23. Accordingly, the chain line position C2 of the switching door 70 is a rear shutting position.

The switching door 70 is operatively linked with the rear air mixing door 21. Therefore, one end of the rotation shaft 70a of the switching door 70 protrudes to the outside of the air conditioning case 11, and is connected to the output shaft of the driving motor 58 of the actuator mechanism of the front air mixing door 21 through the link mechanism.

In the first embodiment of the present invention, a front air passage 100 shown in FIG. 2 is constructed by the front air passage 16 of the heater core 13, the front cool air bypass passage 18, the front warm air passage 23, the front air mixing chamber 24, the communication path 28, and the like. Similarly, a rear air passage 200 shown in FIG. 2 is constructed by the rear air passage 17 of the heater core 13, the rear cool air bypass passage 19, the rear air mixing chamber 34 and the like.

Figure 3:
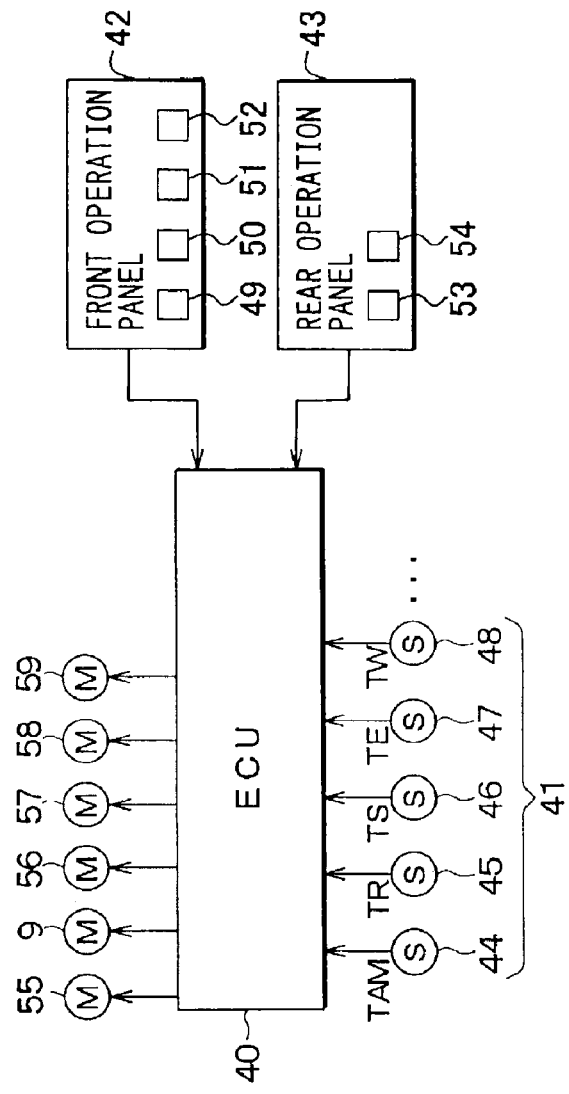
FIG. 3 is a block diagram of an electrical control unit (ECU) of the vehicle air conditioner according to the first embodiment.

FIG. 3 is a block diagram for controlling the air conditioner by using an electronic control unit (ECU) 40. The components of the air conditioner can be automatically controlled by the ECU 40. The ECU 40 is constructed by a microcomputer, circumference circuits of the microcomputer and the like. The ECU 40 controls the blower unit 1 and the air conditioning unit 10 according to a pre-set program. When an engine ignition switch is turned on, electrical power is supplied from a vehicle battery to the ECU 40.

As shown in FIG. 3, sensor signals from a sensor group 41, operation signals from a front operation panel 42 provided in the instrument panel at a front side of the passenger compartment and operation signals from a rear operation panel 43 provided at a rear seat side in the passenger compartment are respectively input to the ECU 40. The sensor group 41 includes an outside air temperature sensor 44 for detecting a temperature TAM of outside air (i.e., air outside the passenger compartment), an inside air temperature sensor 45 for detecting a temperature TR of inside air (i.e., air inside the passenger compartment), a sunlight sensor 46 for detecting an amount TS of sunlight entering the passenger compartment, an evaporator temperature sensor 47 for detecting a temperature TE of air cooled by the evaporator 15 (i.e., a temperature of air immediately after passing through the evaporator 12), and a water temperature sensor 48 for detecting a temperature TW of hot water flowing into the heater core 13.

On the front operation panel 42, a front seat side setting unit such as a front temperature setting unit 49, a front air amount setting unit 50, a front air outlet mode setting unit 51 and an inside/outside air mode setting unit 52 is provided. Similarly, on the rear operation panel 43, a rear seat side setting unit such as a rear temperature setting unit 53 and a rear air outlet mode setting unit 54 is provided. Further, a driving unit for driving air conditioning equipments is controlled by the ECU 40. The driving unit includes the driving motor 55 for driving the inside/outside air selecting door 6 of the inside/outside air switching box 3, the motor 9 for driving the fan 7, the driving motor 56 for driving the front air mixing door 20, the driving motor 57 for driving the front air-outlet mode switching doors 26, 31, the driving motor 58 used in common for driving the rear air mixing door 21 and the switching door 70, and the driving motor 59 for driving the rear air-outlet mode switching doors 37, 38.

Next, operation of the air conditioner according to the first embodiment of the present invention will be now described. When the face mode is set, the defroster door 26 is rotated to fully close the defroster opening portion 25 and to fully open the communication port 28. Further, the foot/face switching door 31 is rotated to fully close the inlet side passage 33 of the front foot opening portion 30. In addition, the rear air-outlet mode switching doors 37, 38 opens the rear face opening portion 35 and closes the rear foot opening portion 36. In this case, when the front air mixing door 20 is rotated to the position A1 in FIG. 2 by control operation of the ECU 40, a maximum cooling is set so that the front air passage 16 of the ventilation passage of the heater core 13 is closed and the front cool air bypass passage 18 is fully opened. In this case, when the blower unit 1 and the refrigerant cycle are operated, air blown by the blower unit 1 flows into the air conditioning case 11 from the air inlet 14, and is cooled by the evaporator 12.

During the maximum cooling, air cooled by the evaporator 12 passes through the front cool air bypass passage 18 and the front air mixing chamber 24, flows toward the front face opening portion 29 through the communication port 28, and is blown toward the upper side of the passenger on the front seat of the passenger compartment from the front face opening portion 29.

When the front air mixing door 20 is operated from the position A1 (maximum cooling position) in FIG. 1 to a predetermined opening position to control temperature of air blown into the passenger compartment, air having passed through the evaporator 12 is introduced into both the front cool air bypass passage 18 and the front air passage 16 of the heater core 13 in accordance with the rotation position of the front air mixing door 20. Air from the front cool air bypass passage 18 and air from the front warm air passage 23 are mixed in the front air mixing chamber 24 so that conditioned air having a predetermined temperature is obtained in the front air mixing chamber 24.

On the other hand, when the rear air mixing door 21 is rotated to the position B1 in FIG. 1 by the control operation of the ECU 40, the air flow in the rear air passage 17 of the heater core 13 is closed, and the rear cool air bypass passage 19 is fully opened. Therefore, air cooled by the evaporator 12 passes through the rear cool air bypass passage 19, and flows toward the rear face opening portion 35 after passing through the rear air mixing chamber 34. Air in the rear face opening portion 35 is blown toward the upper side of the passenger on the rear seat of the passenger compartment.

When the rear air mixing door 39 is operated from the position B1 in FIG. 1 to a predetermined opening position, a ratio between the amount of air from the rear cool air bypass passage 19 and the amount of air from the rear air passage 17 of the heater core 13 is adjusted by the rear air mixing door 21, so that temperature of air blown toward a rear upper side of the passenger compartment can be adjusted. Thus, in the first embodiment, temperature of air blown toward the front seat side of the passenger compartment and temperature of air blown toward the rear seat side in the passenger compartment can be independently controlled by independently controlling the rotation positions of the front and rear air mixing doors 20, 21, during the face air outlet mode.

When the bi-level air outlet mode is set as the front air outlet mode, the defroster door 26 closes the defroster opening portion 25, the foot/face switching door 31 is rotated to a predetermined opening position to open both of the front face opening portion 29 and the inlet side passage 33 of the front foot opening portion 30. Further, when the bi-level air outlet mode is set as the rear air outlet mode, the rear mode switching doors 37, 38 are rotated so that both of the rear face opening portion 35 and the rear foot opening portion 36 are opened.

When the foot air outlet mode is set as the front air outlet mode, the defroster opening portion 25 is slightly opened, and the front foot opening 30 is fully opened. During the foot air outlet mode, a flow ratio of the air amount from the defroster opening portion 25 to the air amount from the front foot opening portion 30 is generally set to 2/8. However, by increasing the opening degree of the defroster opening portion 25, the flow ratio of the air amount from the defroster opening portion 25 to the air amount from the front foot opening portion 30 can be set to approximately 5/5. That is, by increasing the opening degree of the defroster opening portion 25, a foot/defroster air outlet mode can be set from the foot air outlet mode so that defrosting performance is improved. Further, when the foot air outlet mode is set as the rear air outlet mode, the rear face opening portion 35 is closed and the rear foot opening portions 36 are fully opened.

When the defroster air outlet mode is set, the defroster opening portion 25 is fully opened, and the communication port 28 is closed.

Even in the bi-level air outlet mode and in the foot air outlet mode, by independently controlling the operation positions (rotation positions) of the front air mixing door 20 and the rear air mixing door 21, the temperature of air blown toward the front seat side and the temperature of air blown toward the rear seat side of the passenger compartment can be independently controlled.

The operation position of the front air mixing door 20 and the operation position of the rear air mixing door 21 can be automatically controlled by controlling the operation angles of the driving motors 56 58 in accordance with control output of the ECU 40. The operation angles of the driving motors 56, 58 are controlled so that the actual opening degrees of the front and rear air mixing doors 20, 21 correspond to a front target door opening degree and a rear target door opening degree, respectively, that are independently calculated in the ECU 40.

The front target door opening degree and the rear target door opening degree are calculated, respectively, based on a front target air temperature and a rear target air temperature. Here, the front target air temperature is a target temperature of air blown toward the front seat side in the passenger compartment, necessary for maintaining the temperature in the front side space of the passenger compartment at a front set temperature, regardless of a change of vehicle air-conditioning load. Specifically, the front target air temperature is calculated based on the set temperature from the front temperature setting unit 49 of the front operation panel 42, and inside air temperature TR, the outside air temperature TAM and the sunlight amount TS from the sensor group 41.

On the other hand, the rear target air temperature is a target temperature of air blown toward the rear seat side in the passenger compartment necessary for maintaining the temperature in the rear side space of the passenger compartment at a rear set temperature, regardless of a change of vehicle air-conditioning load. Specifically, the rear target air temperature is calculated based on the set temperature from the rear temperature setting unit 53 of the rear operation panel 43, and inside air temperature TR, the outside air temperature TAM and the sunlight amount TS from the sensor group 41.

Further, a target front opening degree of the front air mixing door 20 is calculated based on the above-described front target air temperature, the evaporator air temperature TE and the hot water temperature TW of the heater core 13. Similarly, a target rear opening degree of the rear air mixing door 21 is calculated based on the above-described rear target air temperature, the evaporator air temperature TE and the hot water temperature TW of the heater core 13.

The target front opening degree of the front air mixing door 20 is calculated by percentage, to be 0% at the maximum cooling position (i.e., the position A1) where the front air passage 10 of the heater core 13 is fully closed, and to be 100% at the maximum heating position (i.e., the position A2) where the front air passage 10 of the heater core 13 is fully opened.

Similarly, the target rear opening degree of the rear air mixing door 21 is calculated by percentage, to be 0% at the maximum cooling position (i.e., the position B1) where the rear air passage 17 of the heater core 13 is fully closed, and to be 100% at the maximum heating position (i.e., the position B2) where the rear air passage 17 of the heater core 13 is fully opened.

Figure 4:
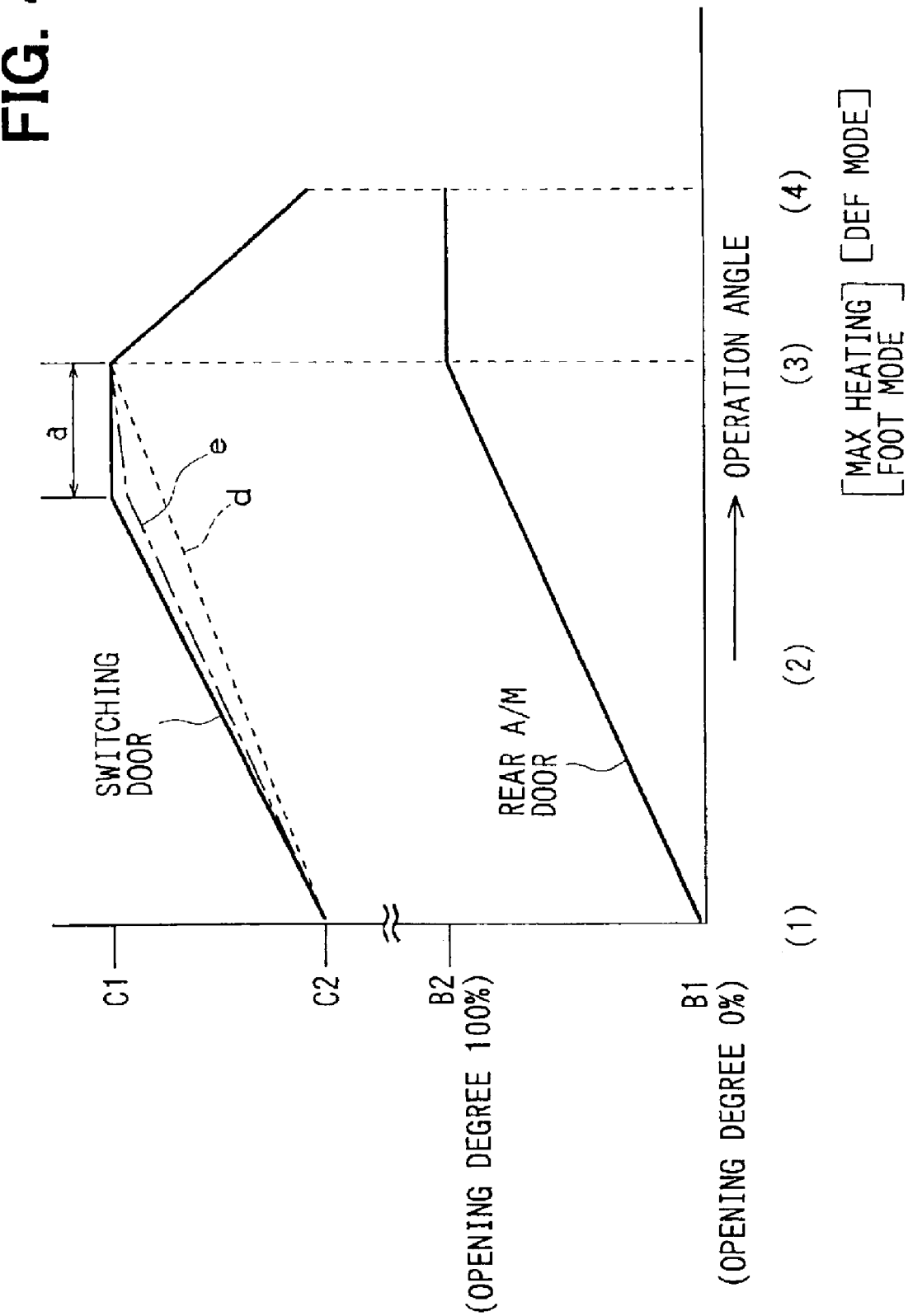
FIG. 4 is a graph showing an operation pattern of a rear air mixing door and a switching door, according to the first embodiment.

Next, link operation of the rear air mixing door 21 and the switching door 70 will be now described. In FIG. 4, the horizontal axis shows the operation angle of the driving motor 58 of the actuator mechanism used in common for the rear air mixing door 21 and the switching door 70. In FIG. 4, the operation angle of the driving motor 58 is zero at the position (1) of the horizontal axis, and becomes maximum at the position (4) of the horizontal axis. As shown in FIG. 4, when the operation angle of the driving motor 58 is increased from the position (1) where the operation angle is zero, the rear air mixing door (rear A/M door) 21 moves from the maximum cooling position B1 toward the maximum heating position B2, and the door opening degree of the rear air mixing door is increased. With the operation of the rear air mixing door 21, the switching door 70 is moved from the rear shutting position C2 toward the partition position C1. Then, when the operation angle of the driving motor 58 is increased to the position (3) in FIG. 4, the rear air mixing door 21 is moved to the maximum heating position B2. In a middle area (2) of the operation angle of the driving motor 58 between the operation angle (1) and the operation angle (3), the opening degree of the rear air mixing door 21 is continuously changed so that the temperature of air blown toward the rear seat side can be continuously changed.

Figure 5:
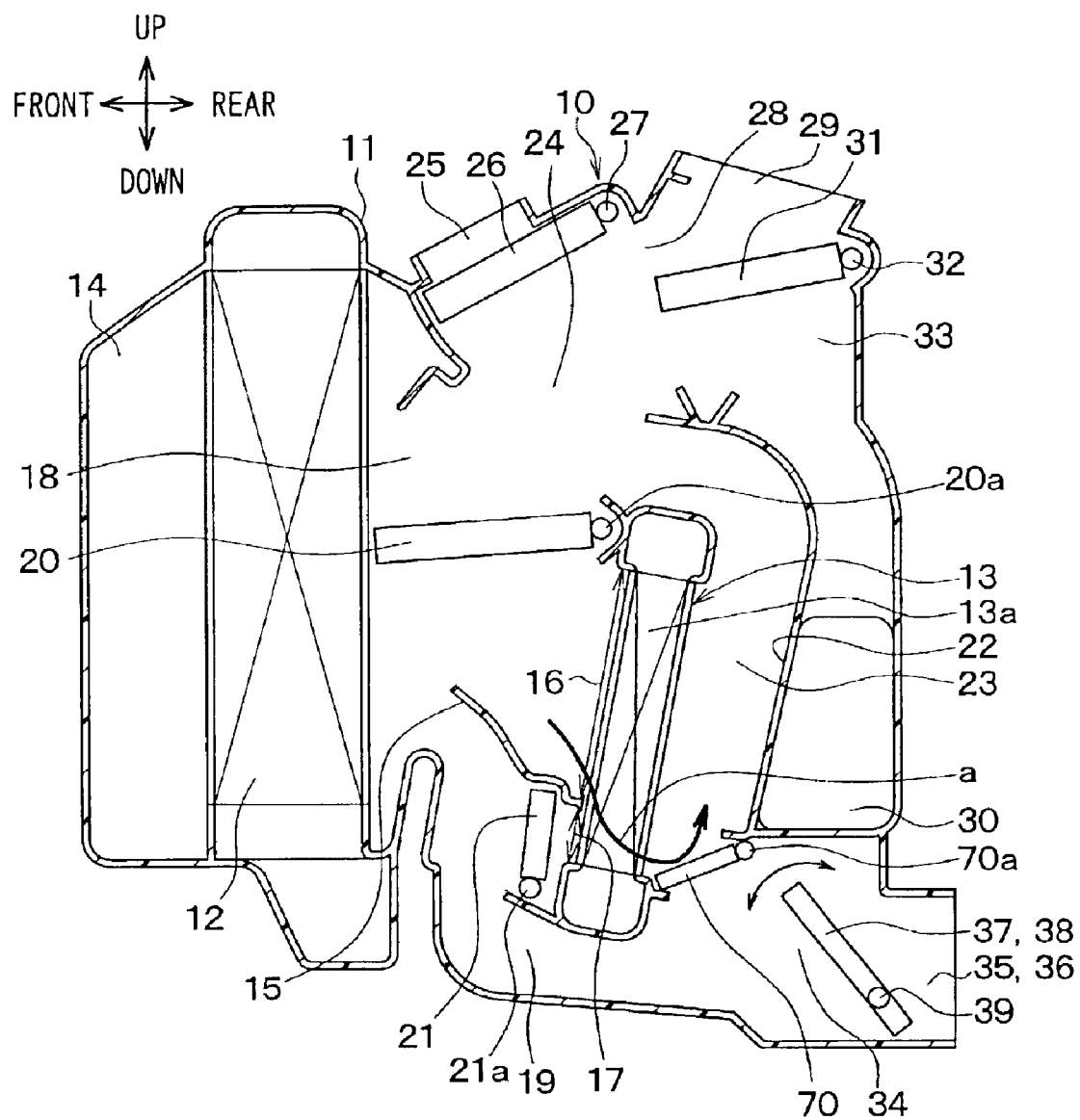
FIG. 5 is a vertical sectional view of the air conditioning unit, showing an operation state of the first embodiment.

When the operation angle of the driving motor 58 is at the position (1), the rear air mixing door 21 is operated to the maximum cooling position B1, and the switching door 70 is operated to the rear shutting position C2 in accordance with the operation of the rear air mixing door 21. FIG. 5 shows the operation state where the rear air mixing door 21 is positioned at the maximum cooling position and the switching door 70 is positioned at the rear shutting position. Therefore, as shown in FIG. 5, even when air flows through the rear air passage 17 in the heat exchanging portion 13a of the heater core 13 as indicated by the arrow "a" in FIG. 5, the switching door 70 prevents warm air from the rear air passage 17 in the heat exchanging portion 13a of the heater core 13 from flowing toward the rear air mixing portion 34. Accordingly, in the first embodiment, maximum cooling capacity of the rear seat side in the passenger compartment can be effectively improved.

Figure 6:
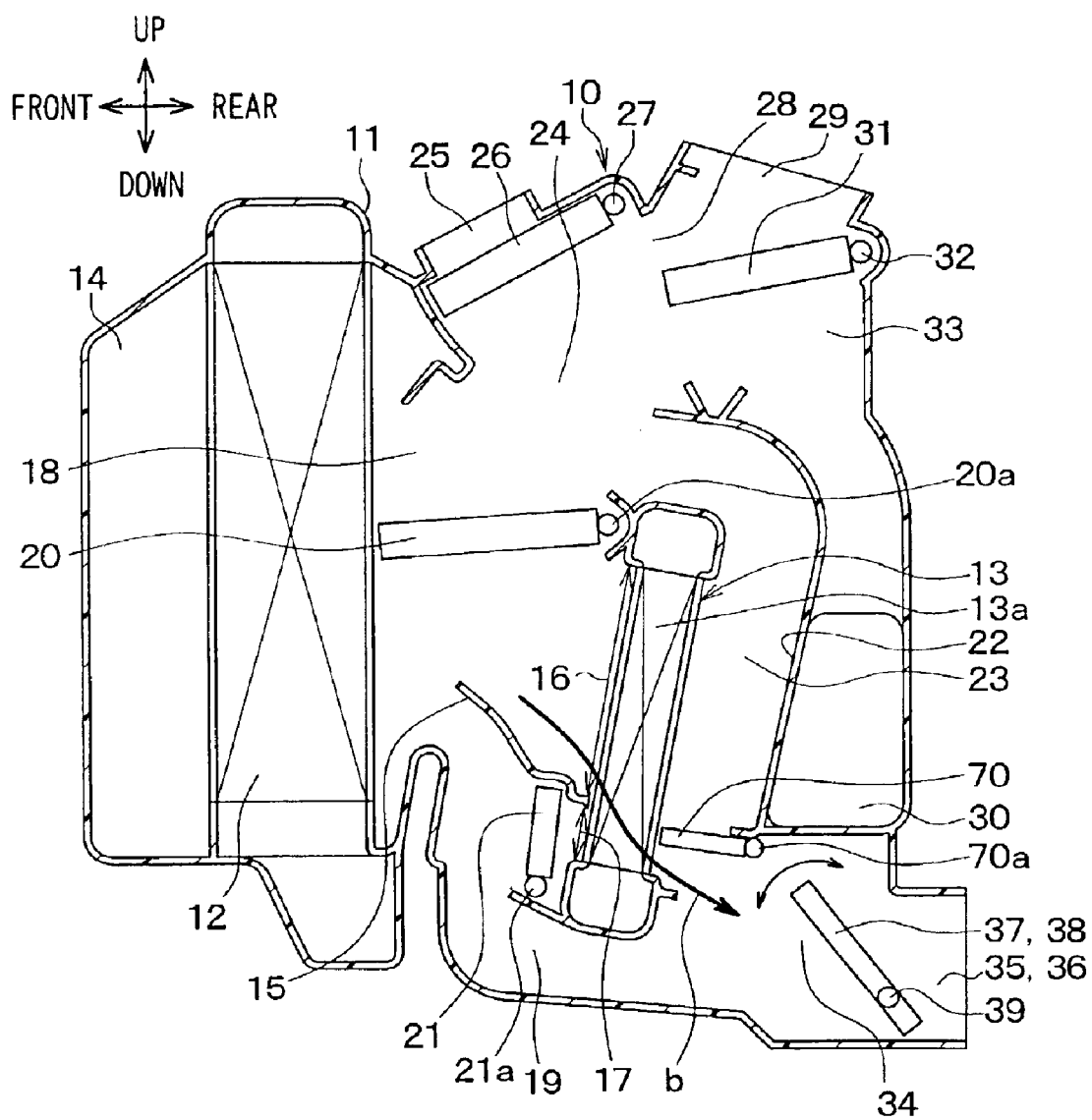
FIG. 6 is a vertical sectional view of the air conditioning unit, showing an operation state of a comparison example in the first embodiment.

As in a comparison example shown in FIG. 6, if the switching door 70 is operated to the partition position when the rear air mixing door 21 is at the maximum cooling position, the warm air from the rear air passage 17 in the heat exchanging portion 13a of the heater core 13 flows into the rear air mixing portion 34, thereby increasing the air temperature blown toward the rear seat side in the maximum cooling. Thus, the maximum cooling capacity on the rear seat side of the passenger compartment is decreased in the comparison example shown in FIG. 6.

On the other hand, if the rear air mixing door 21 is moved from the maximum cooling position B1 to a temperature control area when the front air mixing door 20 is fixed to the maximum cooling position A1, the warm air from the rear air passage 17 in the heat exchanging portion 13a of the heater core 13 may flow into the front air mixing portion 24 through the front warm air passage 23. However, actually, the pressure loss in the rear air passage 200 shown in FIG. 2 is greatly high as compared with the front air passage 100 shown in FIG. 2. Therefore, the warm air passing through the rear air passage 17 in the heat exchanging portion 13a of the heater core 13 is difficult to flow toward the front air mixing portion 24. In addition, the air flow amount in the front air passage 100 is greatly large as compared with the air flow amount in the rear air passage 200. Accordingly, the warm air passing through the rear air passage 17 in the heat exchanging portion 13a of the heater core 13 does not flow into the cool air in the front air passage 100, and does not affect the maximum cooling capacity of the front seat side. This result is confirmed by the inventor of this application.

In the middle area (2) of the operation angle of the driving motor 58 between the operation angle (1) and the operation angle (3), the switching door 70 is continuously moved from the rear shutting position C2 toward the partition position C1 in accordance with the continuous change of the opening degree of the rear air mixing door 21. Thus, an opening area ratio between the rear air passage 17 and the rear cool air bypass passage 19 at the air inlet side of the heat exchanging portion 13a of the heater core 13 is changed by the change of the opening degree of the rear air mixing door 21. Further, an opening area of the rear air passage 17 at the air outlet side of the heat exchanging portion 13a of the heater core 13 is changed by the moved position of the switching door 70. Accordingly, a flow amount ratio between warm air passing through the rear air passage 17 in the heat exchanging portion 13a of the heater core 13 and cool air passing through the rear cool air passage 19 is adjusted by the combination between the opening degree change of the rear air mixing door 21 and the operation position change of the switching door 70.

Thus, the control characteristic of the temperature of air blown toward the rear seat side in the passenger compartment can be variously adjusted by adjustment of the operation states of the doors 21, 70. Therefore, the control characteristic of the temperature of air blown toward the rear seat side in the passenger compartment can be readily adjusted in accordance with a request of a different type vehicle.

As shown in FIG. 4, at the position of the operation angle backward by a predetermined angle "a" from the operation position (3) where the rear air mixing door 21 is at the maximum heating position B2, the switching door 70 reaches at the partition position C1. In the operation area of the predetermined angle "a" in FIG. 4, the switching door 70 is maintained at the partition position C1. After the operation angle of the driving motor 58 reaches to the position (3), the rear air mixing door 21 reaches to the maximum heating position B2. In the first embodiment, the link operation between the rear air mixing door 21 and the switching door 70 is set as shown in FIG. 4, so that the following advantage can be obtained.

When the rear air mixing door 21 is moved from the maximum heating position B2 toward the maximum cooling position so that the rear cool air bypass passage 19 becomes to be slightly opened, the pressure loss in the rear cool air bypass passage 19 is smaller than the air passage in the heat exchanging portion 13a of the heater core 13. Therefore, even when the rear cool air bypass passage 19 is slightly opened, the cool air amount flowing into the rear cool air bypass passage 19 is greatly increased. Accordingly, if the switching door 70 is moved from the partition position C1 toward the rear shutting position C2 in accordance with the operation characteristic graph "d" in FIG. 4 at the same time as the rear air mixing door 21 opens the rear cool air bypass passage 19, the warm air amount toward the rear seat side is rapidly decreased because the opening area of the rear air passage 17 in the heat exchanging portion 13a of the heater core 13 is reduced by the switching door 70. As a result, at the time where the rear air mixing door 21 is moved from the maximum heating position B2 toward the maximum cooling position B1, the temperature of air blown toward the rear seat side of the passenger compartment is rapidly reduced, and air conditioning feeling for the passenger in the rear seat may be deteriorated.

Figure 8:
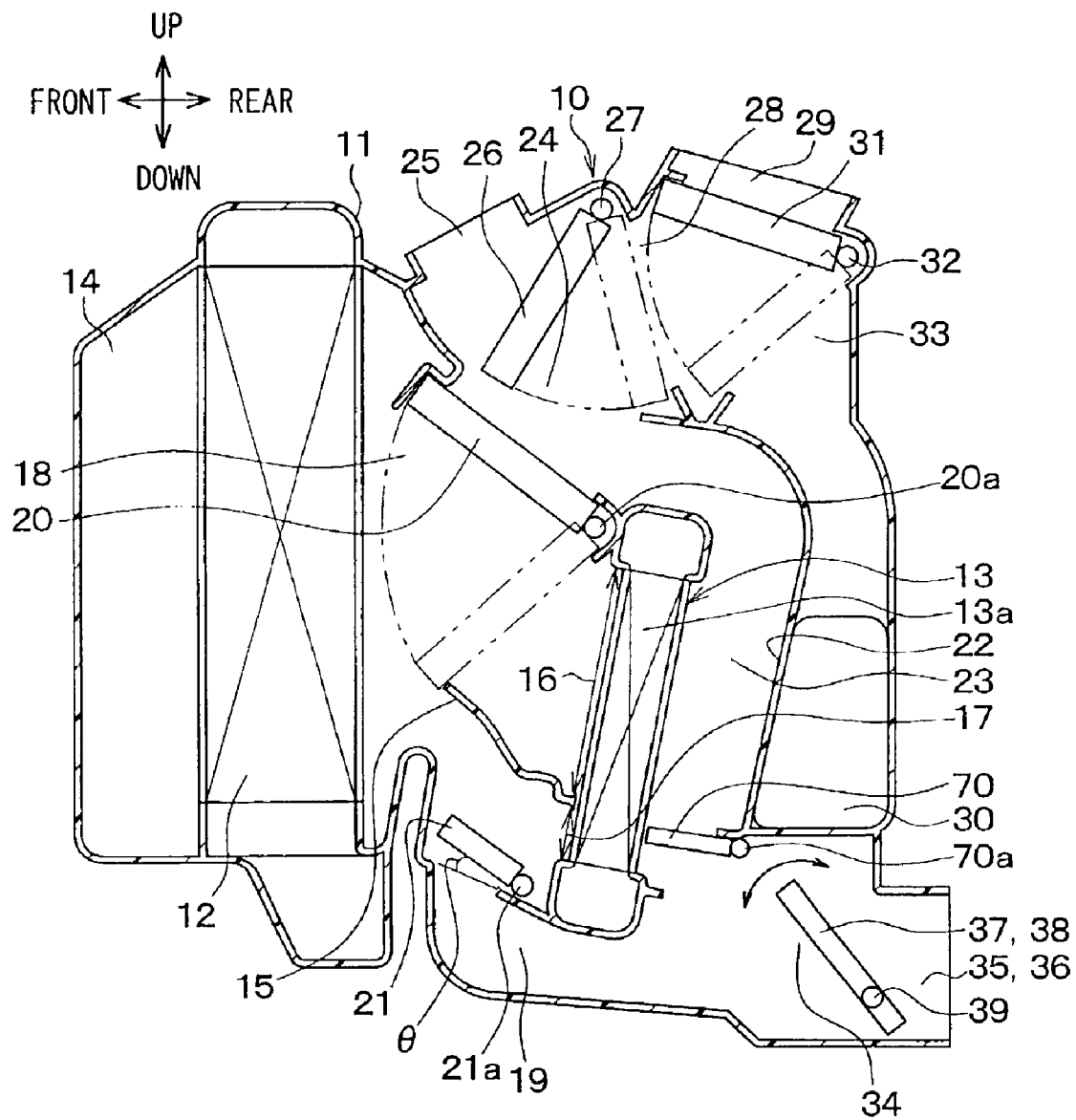
FIG. 8 is a vertical sectional view of the air conditioning unit, showing a further another operation state of the first embodiment.

According to the first embodiment of the present invention, when the rear air mixing door 21 is operated from the maximum heating position B2 toward the middle opening position, in a predetermined operation area corresponding to the predetermined angle range "a" in FIG. 4, the switching door 17 is maintained at the partition position C1. After the rear air mixing door 21 is moved by a predetermined opening degree from the maximum heating position, the switching door 70 is moved from the partition position C1 toward the rear shutting position C2. FIG. 8 shows the state where the switching door 70 is maintained at the partition position C1 while the rear air mixing door 21 opens the rear cool air bypass passage 9 by a small opening degree θ.

As described above, while the rear air mixing door 21 opens the rear cool air bypass passage 19 by the small opening degree θ, the opening area of the outlet passage of the rear air passage 17 in the heater core 13 is not reduced by the switching door 70. As a result, when the rear cool air passage 19 is slightly opened by the rear air mixing door 21, the warm air amount flowing toward the rear seat side in the passenger compartment through the rear air passage 17 of the heater core 13 is not greatly reduced, thereby preventing a rapid temperature reduce of air blown toward the rear seat side in a temperature control area proximate to the maximum cooling.

In the above-described example, as shown in FIG. 4, while the rear air mixing door 21 is operated in the predetermined area "a" from the maximum heating position B2 toward the temperature control position, the switching door 70 is maintained at the partition position C1. However, in the first embodiment, the rear air mixing door 21 and the switching door 70 can be controlled in accordance with the control characteristic graph "e" shown in FIG. 4. That is, while the rear air mixing door 21 is operated in the predetermined area "a" from the maximum heating position B2 toward the maximum cooling position B1, the movement of the switching door 70 is controlled to be changed slowly relative to the opening degree change of the rear air mixing door 21. Even when the switching door 70 is operated in accordance with the control characteristic shown by the graph "e" in FIG. 4, the above-described advantage can be obtained.

According to the first embodiment, when the rear air mixing door 21 is moved from the maximum heating position B2 toward the maximum cooling position B1, relative to an opening degree increase rate of the rear cool air bypass passage 19 due to the rear air mixing door 21, an opening degree decrease rate of the rear air passage 17 in the heater core 13 due to the switching door 70 is made smaller when the switching door 70 is moved from the partition position C1 toward the rear shutting position C2.

Figure 7:
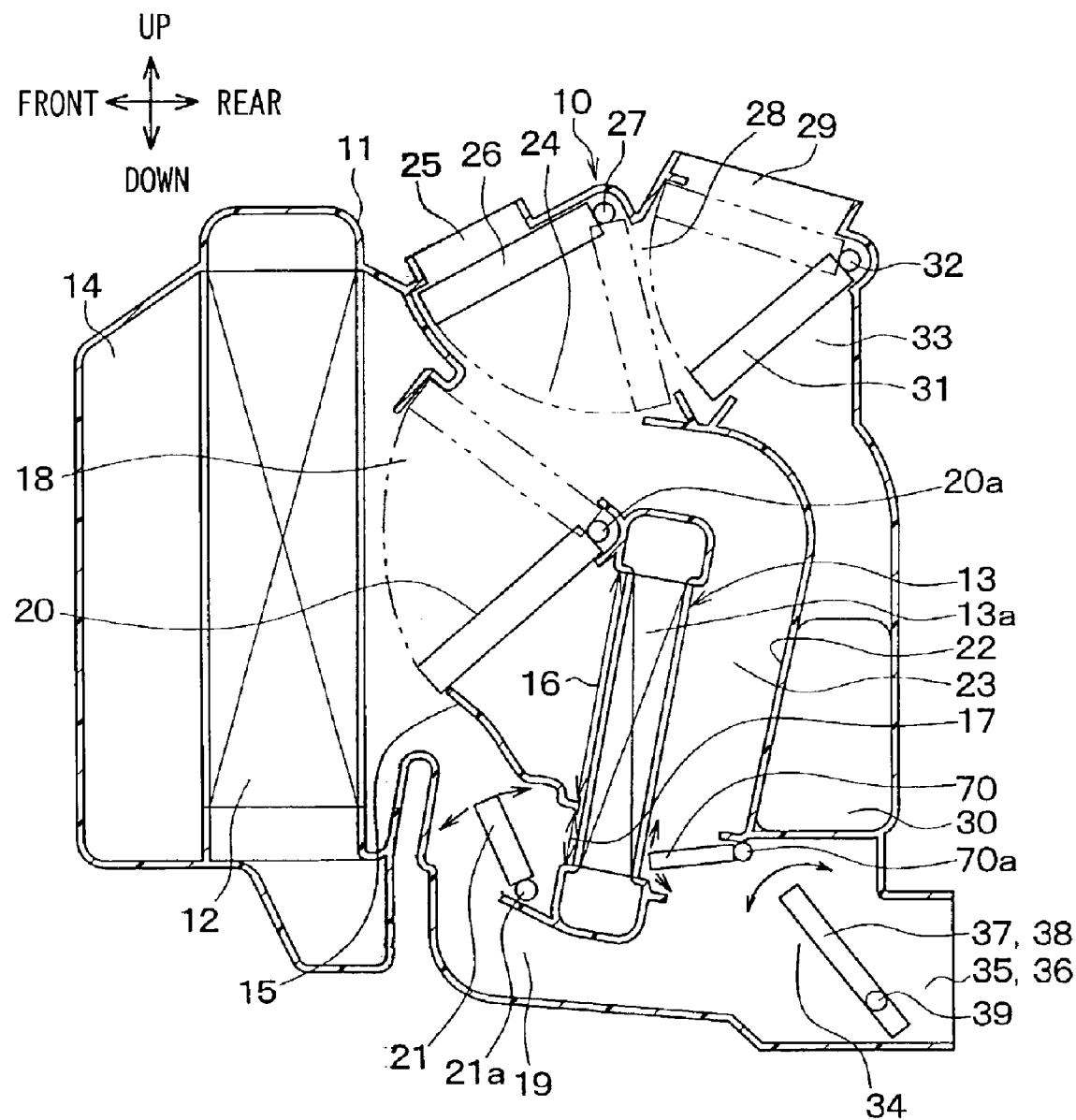
FIG. 7 is a vertical sectional view of the air conditioning unit, showing an another operation state of the first embodiment.

When the rear air mixing door 21 is operated in a rear temperature control area at an operation angle except for the predetermined area "a" in FIG. 4, the switching door 70 is operated with in accordance with the operation of the rear air mixing door 21. FIG. 7 shows the operation state in the rear temperature control area. In FIG. 7, the door position of the front air mixing door 20 can be suitably controlled.

Among the operation angle of the driving motor 58, the operation angle from the position (1) to the position (3) in FIG. 4 is determined based on the rear target door opening degree calculated in the ECU 40. When the defroster mode is selected as the front air outlet mode from the front air outlet mode setting unit 51, the ECU 40 receives a defroster mode signal, and outputs a control signal to the driving motor 58, for setting the operation angle of the driving motor 58 to the maximum angle (position(4)). Therefore, when the defroster mode is set as the front air outlet mode, the driving motor 58 is operated at the position (4) in FIG. 4, and the operation angle of the driving motor 58 becomes maximum. When the operation angle of the driving motor 58 is changed from the position (3) to the position (4), the switching door 70 is moved from the partition position C1 to the rear shutting position C2. In the first embodiment, an idling mechanism is provided in the link mechanism 21b through which the rotation shaft 21a of the rear air mixing door 21 and the output shaft of the driving motor 58 are connected, so that the rear air mixing door 21 is maintained at the maximum heating position B2 even when the operation angle of the driving motor 58 is moved from the position (3) to the position (4). Accordingly, when the defroster mode is set, the rear air mixing door 21 is maintained at the maximum heating position B2 while the switching door 70 is moved from the partition position C1 to the rear shutting position C1.

Figure 9:
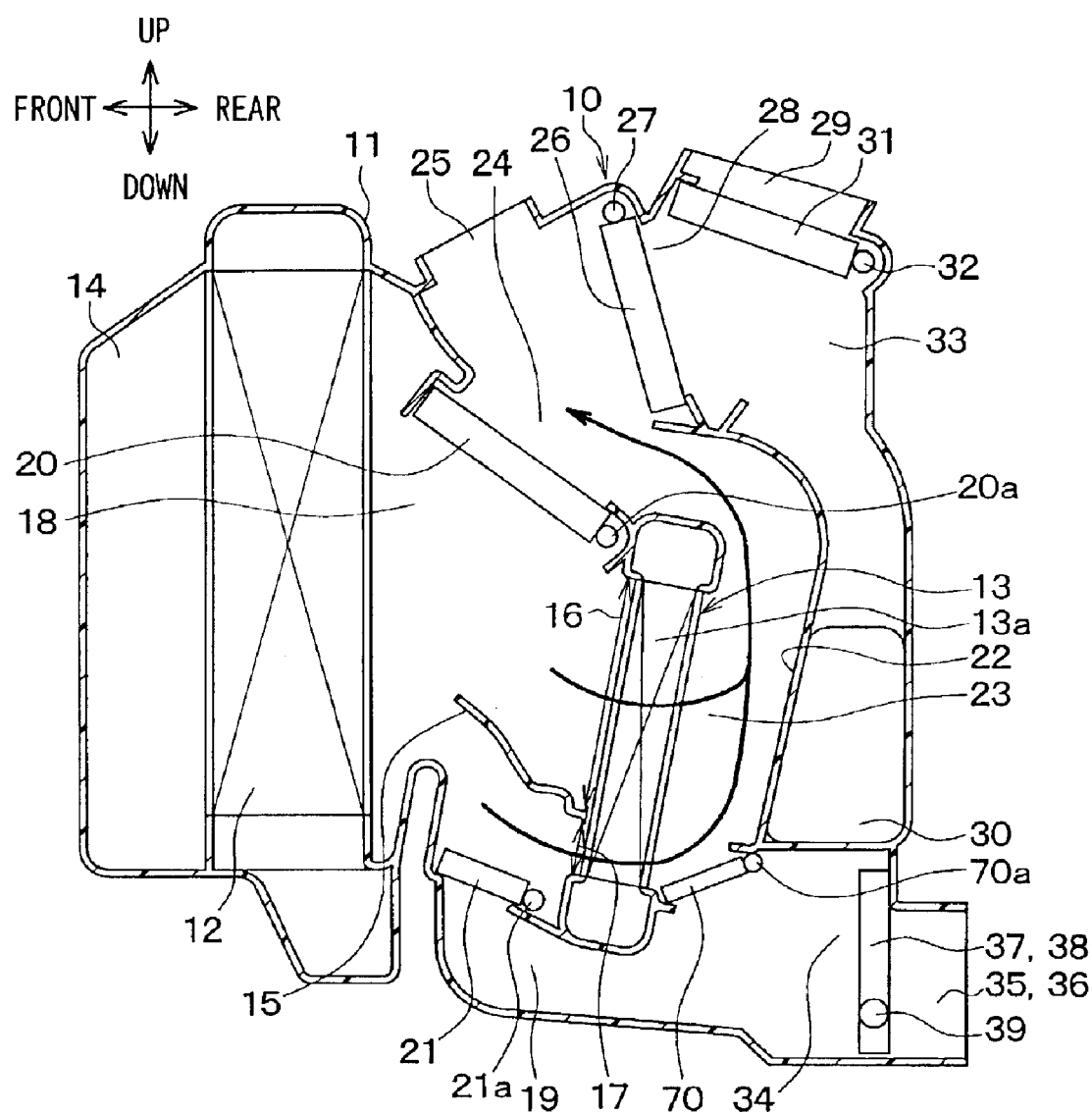
FIG. 9 is a vertical sectional view of the air conditioning unit, showing a further another operation state of the first embodiment.

FIG. 9 shows the operation state of the vehicle air conditioner when the defroster air outlet mode is set. As shown in FIG. 9, in the defroster mode, all warm air passing through the front air passage 16 and the rear air passage 17 of the heat exchanging portion 13a of the heat exchanger 13 is blown toward the windshield of the vehicle through the defroster opening 25. Accordingly, in the defroster air outlet mode, the air amount blown toward the windshield from the defroster opening 25 can be increased, and defrosting capacity (defogging capacity) can be improved.

In the example of FIG. 9, the front air mixing door 20 is operated to the maximum heating position A1 in the defroster air outlet mode. However, in the defroster air outlet mode, the opening degree of the front air mixing door 20 can be adjusted so that the temperature of air blown into the defroster opening 25 can be adjusted.

As described above, in the first embodiment, the common operation mechanism for operatively linking the rear air mixing door 21 and the switching door 70 is constructed by the driving motor 58 and the link mechanisms 21b, 70b.

In the first embodiment of the present invention, at the positions (3) and (4) of the operation angles of the driving motor 58, the rear air mixing door 21 is positioned at the maximum heating position. Therefore, the position (3) of the operation angle of the driving motor 58 is a first maximum-heating operation position of the present invention, and the position (4) of the operation angle of the driving motor 58 is a second maximum-heating operation position of the present invention.

A second preferred embodiment of the present invention will be now described with reference to FIG. 10. In the above-described first embodiment, when the operation angle of the driving motor 58 is increased from the position (1) where the operation angle of the driving motor 58 is zero, the rear air mixing door 21 is moved from the maximum cooling position B1 toward the maximum heating position B2, and the switching door 70 is moved from the rear shutting position C2 toward the partition position C1 by a fixed change rate relative to the change of the operation angle of the driving motor 58. However, in the second embodiment, as shown in FIG. 10, when the operation angle of the driving motor 58 is increased from the position (1), while the operation angle of the driving motor 58 is increased to a predetermined amount "b", the change rate of the operation position of the switching door 70 relative to the change of the operation angle of the driving motor 58 is made smaller than a predetermined rate. After the operation angle of the driving motor 58 is increased to the predetermined amount "b", the change rate of the operation position of the switching door 70 is made larger than the predetermined rate.

When the rear air mixing door 21 is moved from the maximum cooling position B1 toward the maximum heating position B2, if the switching door 70 is simultaneously moved from the rear shutting position C2 toward the partition position C1, the air temperature blown toward the rear seat side may be increased rapidly sometimes at a position proximate to the maximum cooling.

According to the present invention, as shown in FIG. 10, the change rate of operation position of the switching door 70 is made smaller in a predetermined range of the operation angle from zero to the predetermined amount "b", so that the opening degree of the rear air passage 17 of the heater core 13 is restricted to a small amount in the predetermined range. Thus, it can prevent the air temperature blown toward the rear seat side in the passenger compartment from being rapidly increased at the position proximate to the maximum cooling when the rear air mixing door 21 is moved from the maximum cooling position B1 toward the maximum heating position B2.

In the second embodiment, the other parts are similar to those of the above-described first embodiment, and detail description thereof is omitted.

A third preferred embodiment of the present invention will be now described with reference to FIG. 11. In the third embodiment, the operation position of the switching door 70 is changed in stepwise, relative to the change of the operation angle of the driving motor 58. In the third embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

For example, in the above-described embodiments of the present invention, the operation mechanism for operating in common the rear air mixing door 21 and the switching door 70 is constructed by the actuator mechanism having the driving motor 58. However, the common operation mechanism may be constructed by a manual operation mechanism that is operated manually.

Alternatively, a special actuator mechanism having a driving motor for driving the switching door 70 and a special actuator mechanism having a driving motor for driving the rear air mixing door 21 may be provided. In this case, the two actuator mechanisms may be operatively linked electrically by the ECU 40, so that the switching door 70 and the rear air mixing door 21 are operatively linked as shown in the operation patterns shown in FIGS. 4, 10 and 11. That is, in the present invention, two special actuator mechanisms are electrically lined by the ECU 40, so that rear air mixing door 21 and the switching door 70 can be operatively linked.

Such changes and modifications are to be understood as being within the scope of the present invention as defined by the appended claims.

What is claimed is:

1. An air conditioner for a vehicle having a passenger compartment, the air conditioner comprising:

an air conditioning case defining an air passage, the air conditioning case having a partition for dividing the air passage into a first opening portion for blowing air toward a front side of the passenger compartment and a second opening portion for blowing air toward a rear side of the passenger compartment;

a cooling heat exchanger, disposed in the air conditioning case, for cooling air;

a heating heat exchanger for heating air from the cooling heat exchanger, the heating heat exchanger being disposed in the air conditioning case to form a warm air passage and first and second bypass passages through which air having passed through the cooling heat exchanger bypasses the heating heat exchanger;

a first air mixing door for adjusting a ratio between an amount of air passing through the first bypass passage and an amount of air passing through the heating heat exchanger in such a manner that air blown from the first opening portion has a predetermined temperature;

a second air mixing door for adjusting a ratio between an amount of air from the second bypass passage and an amount of air from the heating heat exchanger in such a manner that air blown from the second opening portion has a predetermined temperature;

a switching door movable to a partition position for partitioning the warm air passage of the heating heat exchanger into a first passage portion for introducing air toward the first opening portion and a second passage portion for introducing air toward the second opening portion; and an operation mechanism used for operating both the switching door and the second air mixing door, wherein:

the switching door is movable between the partition position and a rear shutting position where all air from the heating heat exchanger flows toward the first opening portion; and the switching door and the second air mixing door are operatively linked to the operation mechanism and to each other such that the operation mechanism regulates the movement f the switching door based on the movement of the second air mixing door.

2. The air conditioner according to claim 1, wherein:

the second air mixing door is moved between a maximum rear heating position corresponding to the second cool air bypass passage being closed and the second passage portion of the heating heat exchanger being opened by the second air mixing door, and a maximum rear cooling position corresponding to the second cool air bypass passage being opened and the second passage portion of the heating heat exchanger being closed by the second air mixing door; and the operation mechanism is constructed to have a first operation position corresponding to the second air mixing door being positioned at the maximum heating position and the switching door being positioned at the partition position, and a second operation position corresponding to the second air mixing door being positioned at the maximum heating position and the switching door being positioned at the rear shutting position.

3. The air conditioner according to claim 2, wherein:

the first opening portion includes at least a defroster opening for blowing air toward an inner surface of a windshield of the vehicle; and the operation mechanism is operated to the second operation position in a defroster mode where air is blown toward the inner surface of the windshield through the defroster opening.

4. The air conditioner according to claim 3, further comprising:

a control unit for electrically controlling the operation mechanism, wherein:

the control unit includes a defroster mode setting member for setting the defroster mode; and the control unit controls the operation mechanism to be operated to the second operation position in the defroster mode.

5. The air conditioner according to claim 2, wherein:

the operation mechanism is constructed to have a third operation position corresponding to the switching door being positioned at the rear shutting position and the second air mixing door being positioned at the maximum cooling position.

6. The air conditioner according to claim 5, wherein:

when the operation mechanism is moved from the third operation position toward the first operation position, the second air mixing door is moved from the maximum cooling position toward the maximum heating position, and the switching door is moved from the rear shutting position toward the partition position.

7. The air conditioner according to claim 5, wherein:

when the operation mechanism is moved from the third operation position toward the first operation position, a change in the rate of the movement of the switching door relative to the rate of the movement of the operation mechanism is made smaller than a predetermined rate during a predetermined operation range from the third operation position, and the change in the rate of the movement of the switching door is made larger than the predetermined rate after the predetermined operation range.

8. The air conditioner according to claim 2, wherein:

when the operation mechanism is in a predetermined operation range before the first operation position while the operation mechanism is operated from the third operation position to the first operation position, the switching door is maintained at the partition position while the second air mixing door is changed toward the maximum heating position.

9. The air conditioner according to claim 1, wherein:

the second air mixing door is moved between a maximum rear heating position corresponding to the second cool air bypass passage being closed and the second passage portion of the heating heat exchanger being opened by the second air mixing door, and a maximum rear cooling position corresponding to the second cool air bypass passage is opened and the second passage portion of the heating heat exchanger being closed by the second air mixing door; and the operation mechanism is constructed such that the switching door is moved from the rear shutting position toward the partition position when the second air mixing door is moved from the maximum cooling position toward the maximum heating position.

10. The air conditioner according to claim 1, wherein:

the second air mixing door is moved between a maximum heating position corresponding to the second cool air bypass passage being closed and the second passage portion of the heating heat exchanger being opened by the second air mixing door, and a maximum cooling position corresponding to the second cool air bypass passage being opened and the second passage portion of the heating heat exchanger being closed by the second air mixing door;

when the second air mixing door is moved from the maximum heating position toward the maximum cooling position to increase an opening degree of the second cool air bypass passage, the switching door is moved from the partition position toward the rear shutting position to reduce an opening degree of the second passage portion of the heating heat exchanger; and the operation mechanism is constructed such that the rate of opening of the second passage portion of the heating heat exchanger, when the switching door is moved from the partition position toward the rear shutting position, is made smaller, relative to the rate of opening of the second cool air bypass passage when the second air mixing door is moved from the maximum heating position toward the maximum cooling position.

11. An air conditioner for a vehicle having a passenger compartment, the air conditioner comprising:

an air conditioning case defining an air passage, the air conditioning case having a partition for dividing the air passage into a first opening portion for blowing air toward a front side of the passenger compartment and a second opening portion for blowing air toward a rear side of the passenger compartment;

a cooling heat exchanger, disposed in the air conditioning case, for cooling air;

a heating heat exchanger for heating air from the cooling heat exchanger, the heating heat exchanger being disposed in the air conditioning case to form a warm air passage and first and second bypass passages through which air having passed through the cooling heat exchanger bypasses the heating heat exchanger;

a first air mixing door for adjusting a ratio between an amount of air passing through the first bypass passage and an amount of air passing through the heating heat exchanger in such a manner that air blown from the first opening portion has a predetermined temperature;

a second air mixing door for adjusting a ratio between an amount of air from the second bypass passage and an amount of air from the heating heat exchanger in such a manner that air blown from the second opening portion has a predetermined temperature; and a switching door movable to a partition position for partitioning the warm air passage of the heating heat exchanger into a first passage portion for introducing air toward the front opening portion and a second passage portion for introducing air toward the second opening portion; wherein:

the switching door is disposed to be movable between the partition position and a rear shutting position where all air from the heating heat exchanger flows toward the first opening portion; and the second air mixing door is movable between a maximum heating position corresponding to the second cool air bypass passage being opened and the second passage portion of the heating heat exchanger being opened by the second air mixing door, and a maximum cooling position corresponding to the second cool air bypass passage being opened and the second passage portion of the heating heat exchanger being closed by the second air mixing door; and the switching door and the second air mixing door are operatively linked with each other to coordinate their movement such that the switching door moves from the rear shutting position toward the partition position when the second air mixing door is moved from the maximum cooling position toward the maximum heating position.

12. The air conditioner according to claim 11, wherein:

when the second air mixing door is positioned at the maximum cooling position, the switching door is positioned at the rear shutting position.

13. An air conditioner for a vehicle having a passenger compartment, the air conditioner comprising:

an air conditioning case defining an air passage, the air conditioning case having a partition for dividing the air passage into a first opening portion for blowing air toward a front side of the passenger compartment and a second opening portion for blowing air toward a rear side of the passenger compartment;

a cooling heat exchanger, disposed in the air conditioning case, for cooling air;

a heating heat exchanger for heating air from the cooling heat exchanger, the heating heat exchanger being disposed in the air conditioning case to form a warm air passage and first and second bypass passages through which air having passed through the cooling heat exchanger bypasses the heating heat exchanger;

a first air mixing door for adjusting a ratio between an amount of air passing through the first bypass passage and an amount of air passing through the heating heat exchanger in such a manner that air blown from the front opening portion has a predetermined temperature;

a second air mixing door for adjusting a ratio between an amount of air from the second bypass passage and an amount of air from the heating heat exchanger in such a manner that air blown from the second opening portion has a predetermined temperature; and a switching door movable to a partition position for partitioning the warm air passage of the heating heat exchanger into a first passage portion for introducing air toward the front opening portion and a second passage portion for introducing air toward the second opening portion; wherein the switching door is disposed to be movable between the partition position and a rear shutting position where all air from the heating heat exchanger flows toward the first opening portion; and the second air mixing door is movable between a maximum heating position corresponding to the second cool air bypass passage being closed and the second passage portion of the heating heat exchanger being opened by the second air mixing door, and a maximum cooling position corresponding to the second cool air bypass passage being opened and the second passage portion of the heating heat exchanger being closed by the second air mixing door; and when the second air mixing door is moved from the maximum heating position toward the maximum cooling position to increase an opening degree of the second cool air bypass passage, the switching door is moved from the partition position toward the rear shutting position to reduce an opening degree of the second passage portion; and the operation mechanism is constructed such that the rate of opening of the second passage portion when the switching door is moved from the partition position toward the rear shutting position, is made smaller, relative to the rate of opening of the second cool air bypass passage when the second air mixing door is moved from the maximum heating position toward the maximum cooling position.

14. The air conditioner according to claim 13, wherein:

when the second air mixing door is moved from the maximum heating position toward the maximum cooling position, the switching door is maintained at the partition position while the second air mixing door is in a predetermined range from the maximum heating position, and the switching door is moved from the partition position toward the rear shutting position after the second air mixing door is moved to the predetermined range.

* * * * *